Aug. 4, 1959  R. G. WYLIE  2,897,673
HYGROMETERS
Filed June 1, 1955  7 Sheets-Sheet 1

R. G. WYLIE 2,897,673

HYGROMETERS

Filed June 1, 1955

Aug. 4, 1959   R. G. WYLIE   2,897,673
HYGROMETERS
Filed June 1, 1955   7 Sheets-Sheet 7

United States Patent Office

2,897,673
Patented Aug. 4, 1959

2,897,673

HYGROMETERS

Russell George Wylie, Randwick, New South Wales, Australia, assignor to Commonwealth Scientific and Industrial Research Organization, East Melbourne, Victoria, Australia, a body corporate of Australia Application June 1, 1955, Serial No. 512,525

Claims priority, application Australia June 9, 1954

14 Claims. (Cl. 73—336.5)

This invention relates to hygrometers.

Two known absolute hygrometers are the dewpoint hygrometer with which dew-points may be measured directly, and the "Dewcel" hygrometer (described in "Humidity measurement by a new system" by W. F. Hickes, in "Refrigeration Engineering," volume 54, page 351), with which an equilibrium temperature can be measured, from which, making use of the knowledge of the relative vapor pressure of a saturated aqueous solution of lithium chloride as a function of temperature, the dew-point of the gas in equilibrium with the "Dewcel" hygrometer can be deduced. (By "relative vapor pressure" of a solution is meant the ratio of the vapor pressure of the solution to the vapor pressure of water at the same temperature; this ratio is, in general, a function of temperature.) Both of these hygrometers can be made absolute with an accuracy of determination of dew-point temperature of ±0.1 centigrade degree, but often this accuracy can be obtained only when precautions are taken against errors due to contamination. With them errors at least of the order of ±0.1 centigrade degree can occur without the observer's knowledge. Serious difficulty is experienced if an absolute accuracy much higher than ±0.1 centigrade degree is sought with these methods.

The objects of this invention are to provide a hygrometer with which measurements of an equilibrium temperature can be made on a gas from which, once the relative vapor pressure of a saturated solution of the crystalline substance used in the hygrometer and the vapor pressure of water are both known as functions of temperature, the dew-point of the gas can be deduced. In this way the hygrometer will yield reliably an absolute accuracy better than that corresponding to dew-point measurements of ±0.1 centigrade degree accuracy for dew-point temperatures higher than −10 centigrade degrees (at lower dew-point temperatures the absolute accuracy diminishes with decreasing temperature); that will tolerate without appreciable loss of accuracy levels of contamination that would result in appreciable errors in the dew-point and "Dewcel" hygrometers; that can be operated over wide dew-point and pressure ranges; that can be operated with an accuracy of ±0.1 centigrade degree more rapidly than the "Dewcel" hygrometer; and that is more amenable to instrumentation than the dew-point hygrometer.

According to this invention a hygrometer comprises an ionic substance in crystalline form, means for detecting the electrical surface resistance of the ionic substance and changes in that resistance, means for bringing the gas whose humidity is to be measured into contact with the ionic substance at a temperature substantially equal to that of the ionic substance, means for varying the said temperature, and means for measuring the said temperature.

The hygrometer of the present invention is based on the fact that, at relative humidities above a sharply defined value which depends to some extent on temperature, the surface layers of an ionic crystal dissolved in moisture provided by the ambient gas forming a layer of saturated solution which is an electrical conductor. At the critical relative humidity, which depends on the crystalline substance chosen, the layer of saturated solution is in equilibrium with the ambient gas, so that this critical relative humidity is equal to the relative vapor pressure of the saturated solution. The equilibrium obtains for any thickness of the layer greater than a minimum value which depends on the condition of the crystal surface, and which for a clean crystal is comparable with molecular dimensions.

The relative humidity fo a gas of unknown humidity may be brought to any value less than 100% at constant composition merely by changing the temperature. According to the present invention the temperature is measured at which the gas possesses the critical relative humidity as defined above for a selected ionic substance. The water content of the gas can then be deduced from this temperature and a knowledge of the vapour pressure of the saturated solution of the ionic substance as a function of temperature.

The hygrometer consists essentially of a crystal or a group of crystals of an ionic substance associated with two electrodes and bathed in the gas the humidity of which is to be measured. The substantially uniform temperature of the crystal or group of crystals is raised or lowered, as the case may require, until a value is found at which the electrical surface conductance of the crystal or crystals, as indicated by the conductivity or electrical capacity or electrical admittance or any component of the admittance between electrodes, is appreciable and remains substantially constant with the passage of time. It is found that, if a temperature which is slightly higher than the critical value is maintained, the electrical resistance increases steadily until a very high value is reached, which is related to the adsorption of water at the crystal surface. If the crystal is reasonably clean this high value is such that it may be regarded effectively as an open circuit between the electrodes. If a temperature which is slightly lower than the critical is maintained, then the resistance decreases steadily until the ionic substance is excessively dissolved. At the critical temperature the resistance remains substantially constant. If the surface of the ionic substance is clean, and the electrodes are suitable, the actual value of the electrical resistance, the constancy of which indicates that the required temperature has been reached, may be chosen arbitrarily within a very wide range, for example within the range 100,000 ohms to 10 megohms.

The ionic substance is preferably in the form of a single crystal or group of crystals containing no fissures either between crystals or in individual crystals. However, in some circumstances, a mass of discrete crystals may be used. The use of a single crystal is desirable for rapid response and sharply defined equilibrium temperature; an aggregate containing a very large number of very small crystals will generally possess a large internal surface area which will result in the slow intake or liberation of relatively large amounts of water. For ordinary use the ionic substance should be sufficiently soluble in water to give a sufficiently low resistance between the electrodes at the critical relative humidity to allow the use of simple electrical measuring instruments for measuring the resistance between the electrodes. If the crystal is equiaxed the actual resistance, between suitable electrodes, for a given small thickness of the surface layer of solution, is approximately independent of crystal size. For most purposes a size in the range of 0.3 mm. linear dimension to a few millimetres is suitable. For special purposes a crystal in the form of a thin plate may be advantageous. Suitable ionic substances include potassium sulphate, potassium chloride, sodium chloride and calcium chloride hexahydrate.

Reference will now be made to the accompanying drawings in which:

Figures 1 to 5 inclusive are drawn approximately to scale and are four-times actual size.

Figure 1:
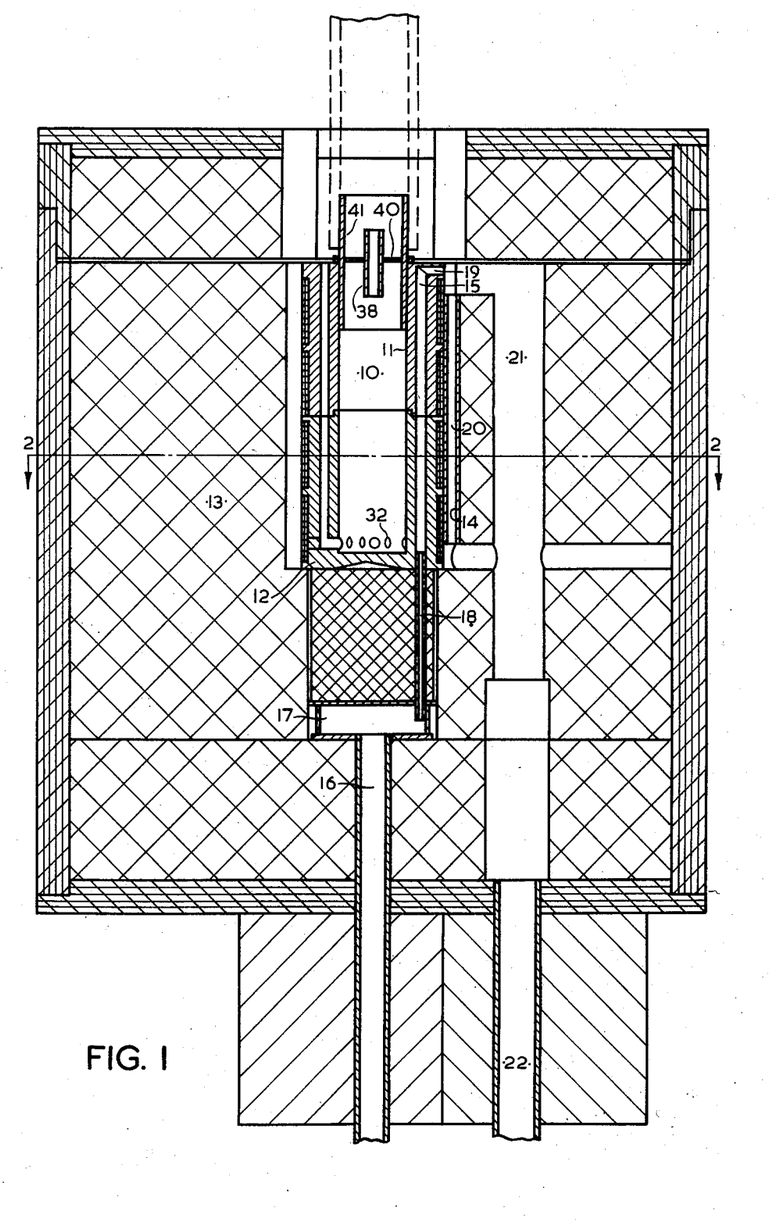
Figure 1 is a sectional elevation of the thermal unit of a hygrometer with provision for cooling and heating a metal enclosure for the ionic substance, for measuring the temperature thereof, and for measuring the resistance of the ionic substance, but not showing details of the electrode mounting.
Figure 2:
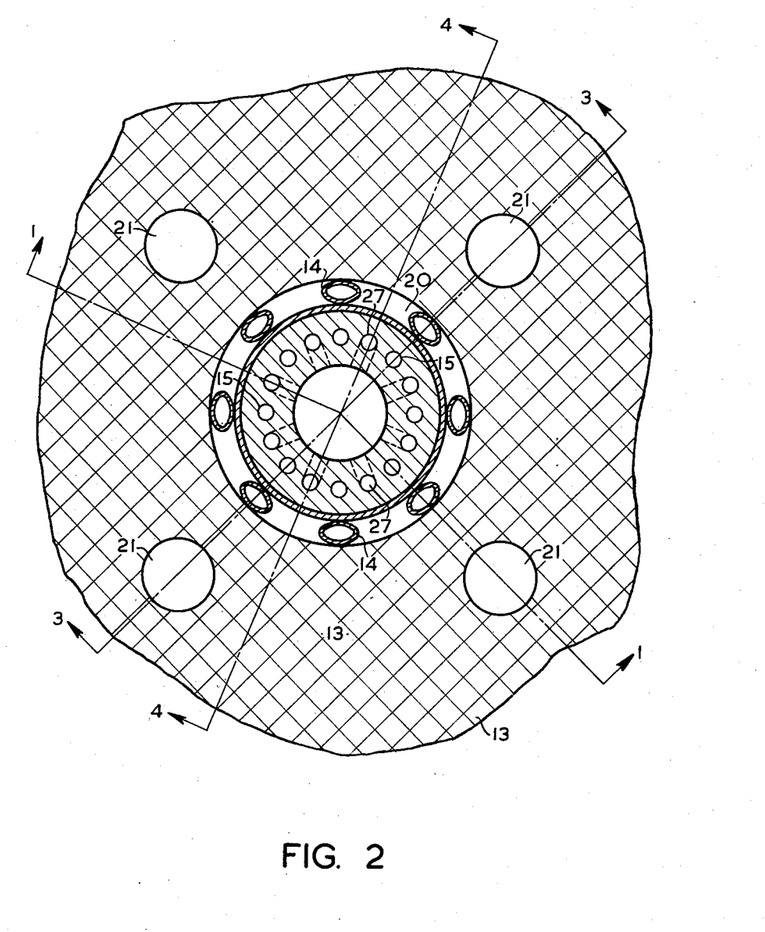
Figure 2 is a sectional plan along the plane 2—2 of Figure 1.
Figure 3:
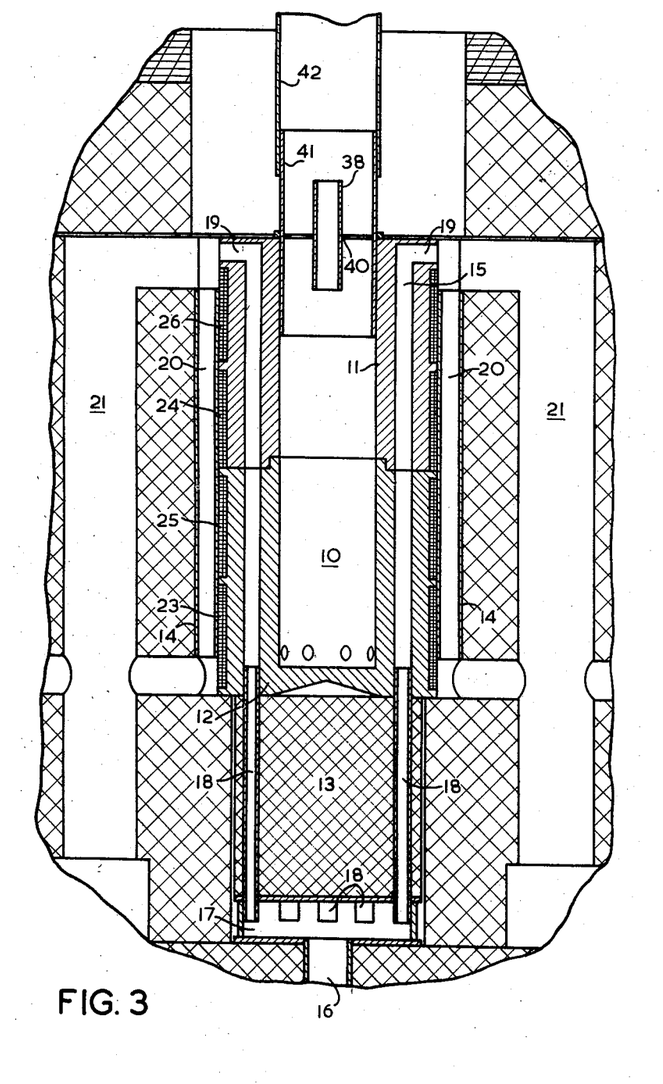
Figure 3 is a sectional end elevation along the plane 3—3 of Figure 2.
Figure 4:
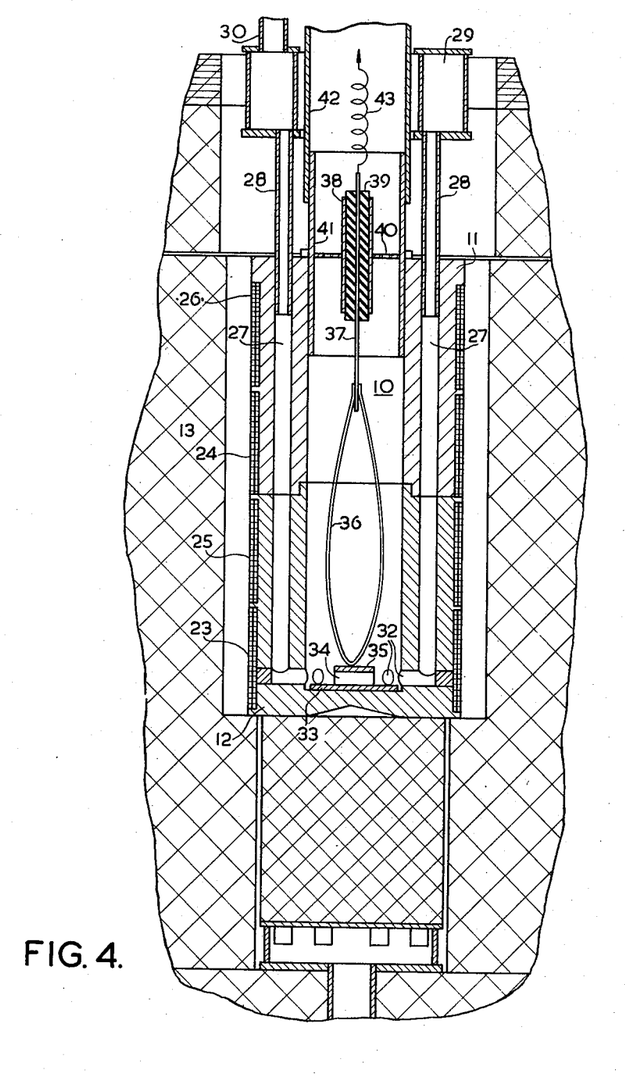
Figure 4 is a sectional end elevation along the plane 4—4 of Figure 2, showing also the crystal mounting and electrodes.

Referring to Figures 1 to 4, a single crystal, a twinned crystal, or a group of crystals having no fissures between crystals or in individual crystals, is held between electrodes in a small metal enclosure shown generally at 10. It is preferred to machine the enclosure in sections from solid silver. The enclosure consists of a cylindrical tubular member 11 closed at one end 12. It may be made in two parts soldered together, as shown, in order to facilitate accurate drilling of longitudinal passages, or in one piece. It is supported inside thermal insulation 13 by means of lengths of plastic tube 14 (see Figure 2) which provide a cushion seat for the enclosure. A number of longitudinal passages 15 (see Figure 3) are drilled through the member 11 through which a gaseous or liquid refrigerant may be passed. Carbon dioxide gas or liquid expanded at a small needle valve from cylinder to atmospheric pressure is a suitable refrigerant. The refrigerant gas enters at 16, passes into the manifold 17, and thence through the thin-walled tubes 18 to the passage 15. The refrigerant gas exhausts at 19 and passes through the passages 21 to exhaust at 22 (Fig. 1). If a liquid refrigerant is used in passages 15, a liquid-tight exhaust manifold should be fitted directly to the exhaust holes 19.

Four separate windings are provided on, but insulated from, the cylindrical surface of the enclosure. Windings 23, 24 are made of an insulated wire through which an electric current may be passed, and thus provide means for raising and varying the temperature of the enclosure 10. Windings 25, 26 are windings of a conventional resistance thermometer, by which the temperature of the enclosure may be measured. The refrigerant gas and heating means enables the temperature of the enclosure to be varied between wide limits. In the preferred method of using the hydrometer, refrigerant gas is passed through the passages 15 at a constant rate, and the temperature of the metal enclosure varied by varying the current through the heating windings 23, 24.

Additional longitudinal passages 27 are provided in the block 11 and alternate with the passages 15. The passages 27 communicate at their upper ends by way of thin-walled metal tubes 28 with an inlet manifold 29. A gas sample inlet is provided at 30. The passages 27 communicate at their lower ends with the bore of the block 11 by way of passages 32. By this means the gas whose humidity is to be measured is brought to the same temperature as that of the enclosure. A graphite plate 33 rests on the bottom 12 of the enclosure (see Figure 4), which constitutes one electrode for the ionic substance or crystal shown at 34. A second graphite electrode 35 is held in contact with the opposite face of the ionic substance by spring pressure provided by the loop 36 of springy wire welded to an axially disposed conductor 37 held in a metal tubular support 38 by insulating means 39. The support 38 is secured by a spider 40 to a tubular member 41 which is a close push fit inside the bore of the enclosure. A flexible tube 42 can be connected to the end of the member 41 to take off the gas sample if desired. A lead to the electrode 35 is shown at 43, connections to the other electrode being by way of the metal enclosure 10. With this electrode construction the ionic substance makes good thermal contact with the enclosure and thus follows its temperature variations closely and with little lag. Any chemically inert conductor can be used for the electrodes 33, 35, for example graphite or platinum. The tubes 38, 41 should be of thin-walled metal to make the thermal capacity of the electrode holder as low as possible.

Figure 5:
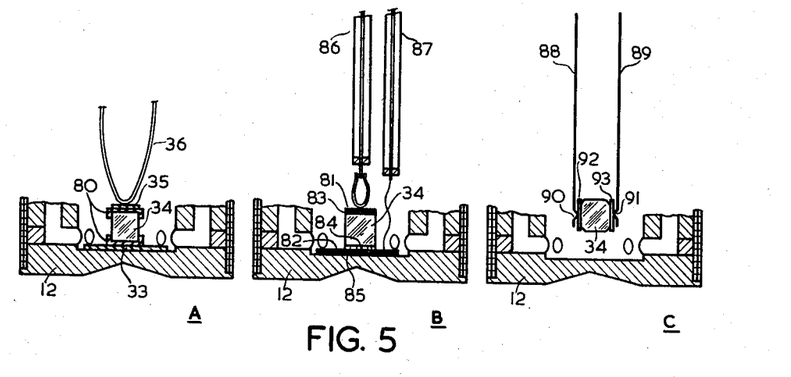
Figure 5 shows three alternative electrode constructions.

Other suitable forms of crystal holder are shown in Figure 5. The electrode assembly shown in Figure 5A differs from that shown in Figure 4 in that opposite faces of the crystal 34, shown as a cubic crystal, have been coated with a conducting layer 80, the conducting layer having been carried around the adjacent edges of the crystal. This arrangement is preferred where the surface resistance of the crystal is measured directly. Each conducting layer 80 may be, for example, a layer of graphite deposited from an equeous colloidal solution, gold foil, or a metallic layer desposited by evaporation in vacuo. If the conducting layer 80 is of sufficient thickness and physical strength the graphite electrodes 33, 35 may be omitted and contact made directly with the conducting layers 80.

Figure 5B shows an electrode assembly suitable for use where the surface resistance is detected by radio frequency means. Platinum electrodes 81, 82 are secured to opposite faces of the crystal 34 by layers of high melting point wax 83, 84. If both electrodes are to be insulated from the metal enclosure, a thin layer of electrical insulating material 85 may be placed between the lower electrode 82 and the base 12 of the enclosure. The insultaing material may be mica. Leads to the electrodes are provided by the coaxial cables 86, 87.

Yet another form of electrode assembly is shown in Fig. 5C which may also be used where neither electrode is to be connected to the metal enclosure. It consists of spaced strips of spring metal 88, 89, such as Phosphor bronze, held in spaced apart relationship at one end. Inwardly directed nipples 90, 91 are formed at the free ends of the two metal strips and co-operate with dimples formed in small laminar electrodes 92, 93 made of graphite, the crystal 34 of ionic substance being held between opposed faces of the graphite electrodes.

It is preferred to so shape and orientate the crystal that the conducting layer forms on planes which are habit faces of the crystal for normal growth from aqueous solution. Particularly when neither electrode is in close thermal contact with the enclosure, as in Fig. 5C, but in any case, the electrode assembly should be constructed as lightly as possible to minimize the thermal capacity. In all cases it is preferred that the crystal be free from contact with any solid substance other than the substance of the electrodes or substance used for the attachment of the electrodes.

Figures 5D, 6:
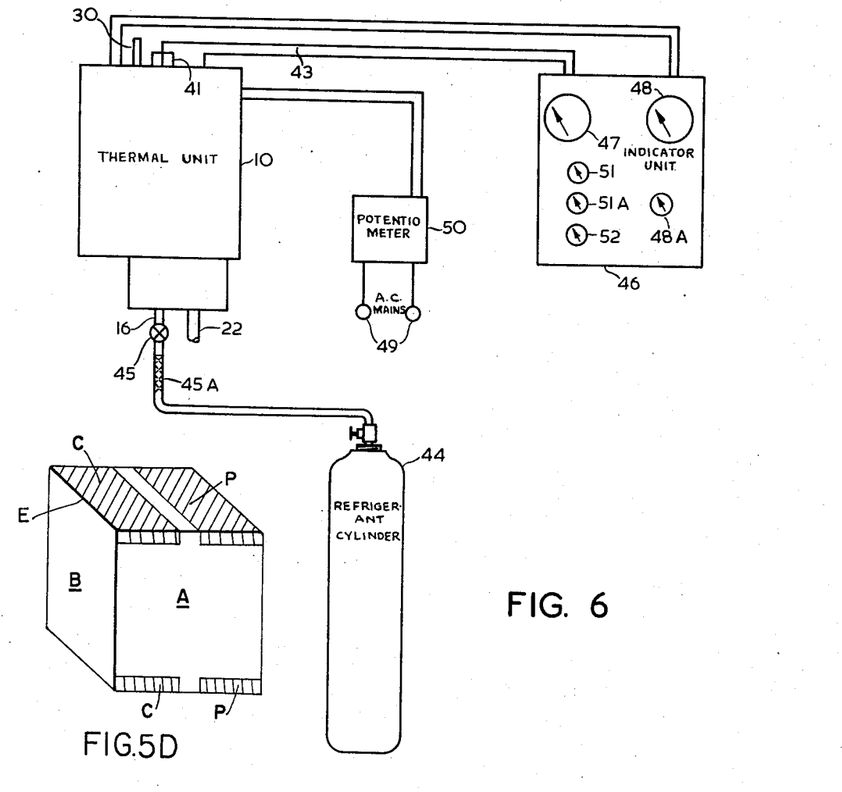
Fig. 5D shows a further crystal-electrode structure construction.
Figure 6 is a diagrammatic representation of the general assembly of the hygrometer arranged for manual operation.

A general assembly of the hygrometer for manual operation is shown in Figure 6. The thermal unit is shown at 10. Cooling or refrigerant gas is supplied to the enclosure in this thermal unit from a cylinder 44 and the rate of flow is adjusted to a suitable constant value by needle valve 45. Preferably the gas is dried by calcium chloride as at 45A. An indicator unit is shown at 46 and includes both a resistance bridge with out-of-balance indicator 47 and a resistance thermometer measuring means with indicator 48. The heating windings 23, 24 in the thermal unit are supplied with electric current from a source connected to terminals 49 by way of a potentiometer, variable transformer, or similar means 50. The gas whose humidity is to be measured is supplied at 30. The operator selects a suitable range setting for the resistance bridge by means of control 51 and sets the sensitivity control 52 to a low value of sensitivity. A continuously variable resistance adjustment is provided by 51A. A range selector switch for the resistance thermometer is illustrated at 48A. Thereafter he reduces the current in the heating winding and watches the indicators 47, 48. The indicator 47 should at first show that the crystal surface resistance is very high. As the temperature falls the relative humidity of the gas increases, and finally reaches the critical value, and slightly exceeds it. The resistance of the crystal drops rapidly from what may be regarded effectively as an open circuit (for example a value greatly exceeding 10 megohms) to the selected resistance. As the indicator 47 moves to show a small out-of-balance reading the operator increases the sensitivity of the indicator. The operator carefully adjusts the current until the indicator 47 is held substantially stationary at or near the balance point (it need not be exactly at the selected resistance value). The temperature of the metal enclosure for the crystal, and therefore of the crystal, is then read off the resistance thermometer, and is a measure of the dew-point temperature of the gas, since there is a one-to-one correspondence between the temperature read and the dew-point temperature.

Figure 7:
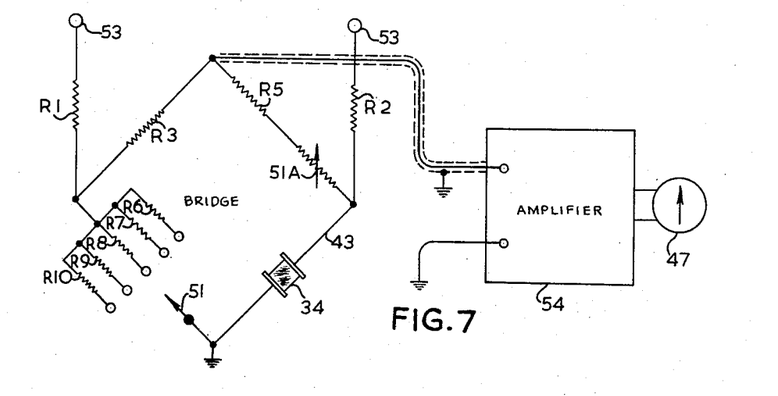
Figure 7 is a circuit diagram, partly in block form, of means for measuring the electrical surface resistance of the ionic substance, and variations in that resistance.

A suitable circuit for measuring the surface resistance of the crystals is shown in Figure 7. In order to keep the current between the electrodes to a low value such that there is no significant uncertainty in the temperature of the conducting layer of the crystal, it is preferred to use a low voltage across the bridge, supplied at terminals 53, for example 5 volts A.C., and to employ an amplifier before the indicator 47. The use of alternating current is preferred since it minimizes or eliminates electrode polarization effects. It is preferred to connect the terminals 53 to a transformer winding which is wound in a single layer and shielded from adjacent windings and metal parts by two consecutive electrostatic screens, the screen adjacent to the winding being connected to the midpoint of the winding and the other screen being grounded. Protective resistances $R_1$, $R_2$, each, for example, of 3,000 ohms may be included. The crystal 34 is placed in one arm of a Wheatstone bridge the other arms of which include a fixed resistance $R_3$, of say 1000 ohms, a variable arm including a variable resistance 51A in series with a fixed resistance $R_5$ of say 500 ohms, and a plurality of resistances $R_6$ to $R_{10}$ any one of which can be selected by a range switch 51. Suitable values are:

| | |
|---|---|
| $R_6$ | ohms 100,000 |
| $R_7$ | do 200,000 |
| $R_8$ | do 500,000 |
| $R_9$ | megohm 1 |
| $R_{10}$ | megohms 2 |

The out-of-balance potential across the other diagonal of the bridge is amplified in any suitable conventional electronic amplifier 54, and the amplifier out-of-balance voltage applied to the indicator 47. Preferably the amplifier includes a gain control to act as a sensitivity control for the indicator meter.

While it is preferred to measure the crystal resistance by a bridge method, this is not essential, and any suitable method can be used. Similarly, the temperature of the crystal enclosure, or of the gas whose humidity is to be measured inside the hygrometer block, can be measured by any suitable means. It is preferred to measure the temperature of the metal enclosure since very rapid response to changes in temperature can then be achieved.

While it is preferred to vary the temperature of the hygrometer block by varying the current through the heating winding, it is possible, but usually less convenient, to hold the current constant and vary the rate of flow of the refrigerant gas.

Any reasonably soluble ionic crystal which is chemically inert to the gas on which measurements are being made and which forms a stable solution (for example it must not hydrolyse in solution to form a colloidal suspension) can be used, but different crystals are particularly suitable for different applications. If it is desired to provide heating means only, and no cooling means, and if relative humidities (reckoned at ambient temperature) lower than about 32% are not required to be measured, then calcium chloride hexahydrate may be used as the ionic substance. With this substance cooling is required for measurement of relative humidities of less than about 32%. If it is desired to use cooling means only, and if relative humidities higher than about 98% do not need to be measured, then potassium sulphate may be used. If both heating and cooling means are provided the whole humidity range can be covered with any soluble crystal, a suitable substance being potassium chloride. Hydrated crystals usually possess relatively low melting points and particular care may be required to avoid the accidental melting of such a crystal in the apparatus. Crystals which are hygroscopic in the ambient atmosphere require care to be taken during mounting to prevent the excessive acquisition of moisture. Some of the alkali halides afford the advantages that they are not hydrated crystals and hence possess high melting points whilst they are easily brought to an accurately rectangular shape by cleavage. The process of cleavage also gives extremely clean surfaces.

In the case of a clean or uncontaminated crystal with suitable electrodes the temperature at which the conductance between the electrodes becomes appreciable and stationary is independent of the value of the conductance. However, the surface of an ionic crystal that has been exposed to the atmosphere can never be regarded as perfectly clean. It has been found that, in a clean atmosphere, a suitable crystal which has been washed with distilled water and dried roughly with filter paper shows no evidence of surface contamination when used in the hygrometer of the present invention. However, the successful operation of the hygrometer does not depend on this low level of contamination being achieved.

The extent to which surface contamination affects the operation of the hydrometer during use may be determined readily by finding successively the equilibrium temperatures for two or more substantially different values of resistance. (As pointed out above, in the case of an uncontaminated crystal these temperatures would be substantially the same). It is preferred to obtain the temperature readings for two values of resistance which are in a ratio of two to one, in which case the difference between the determined values of temperature is approximately equal to the error in that one of the two temperatures which corresponds to the smaller resistance. Consequently, if the contamination is not too great, the correct equilibrium temperature will be obtained with a given accuracy by balancing the hygrometer for a value of resistance such that the balance temperature for twice that resistance value does not differ from the measured value by more than the allowable margin of error. If, in very exceptional cases, this procedure would lead to excessive solution of the crystal, which would be manifest by an inconveniently sluggish response of the hygrometer to temperature changes in the neighbourhood of the balance temperature, the true critical temperature can be obtained approximately by determining the balance temperatures corresponding to two or more resistance values and, after plotting the temperatures against the resistances, extrapolating the curve to give the temperature corresponding to zero resistance, which is the required value.

In the hygrometers according to this invention so far described the surface resistance or conductivity of the ionic substance has been measured by means of electrodes making electrical contact with faces of the crystal. In those embodiments either direct current or low frequency alternating currents have been used in measuring the resistance. However, this measurement can be effected by radio frequency means in which case electrical contact between the electrodes and the crystal faces is not necessary. In this case two platinum electrodes about the same size as two opposite faces of the crystal can be attached to those faces by a film of wax, as illustrated in Fig. 5B.

The electrical characteristics of a non-inductive element, such as a hygrometer crystal, with two associated electrodes can be represented at a single frequency in terms of a capacitance in parallel with a resistance.

If the surface of the crystal possesses no appreciable conductivity, such as results from the presence of moisture, the electrical equivalent at a frequency of the order of 1 mc./s. is a capacitance in parallel with a resistance of such high magnitude as to be unimportant.

As surface conduction develops on the crystal, the parallel resistance in the equivalent circuit decreases soon becoming comparable in impedance with the parallel capacity. The parallel capacity, however, will also change markedly, being increased. The reciprocal of the parallel resistance of the equivalent is, roughly but not accurately, proportional to the surface conductivity of the crystal. The further the electrodes are removed from actual contact with the crystal the less accurately will this proportionality obtain.

Consequently, it is desirable to apply plane electrodes to opposite faces of the crystal as close to them as possible and to measure the parallel resistance between the electrodes, that is, to measure the real part of the complex admittance between the electrodes.

Figure 8:
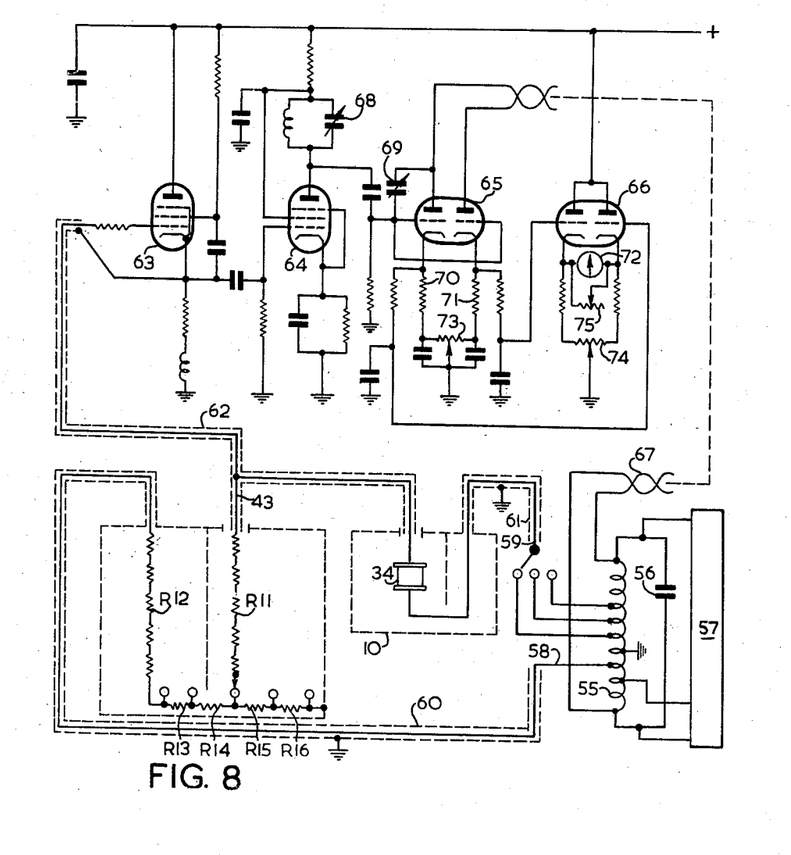
Figure 8 is a circuit diagram, partly in block form, of radio frequency means for detecting the surface resistance of the ionic substance, and variations in that resistance.

Fig. 8 shows means by which this can be effected. A radio frequency bridge includes the crystal 34, resistances $R_{11}$ to $R_{16}$, and the inductor 55. The inductor 55 with capacitor 56 constitutes the tank circuit of the radio frequency oscillator 57 operating at, for example, 1 mc./s. The inductor 55 is centre-tapped and those portions of the inductor between the centre-tap and the leads 58, 59 represent two of the arms of the bridge. Connections between the inductor 55 and the other components of the bridge are by means of coaxial cables 60, 61 the outer braids of which are earthed. The out-of-balance voltage appears between lead 43 and earth and is applied by means of a coaxial cable 62 to a cathode follower 63, and thence to a zero phase shift amplifier 64, synchronous phase-selective rectifier 65 and balanced indicator 66.

The bridge is designed so that to a good approximation only the parallel resistive component of admittance of the crystal gives rise to a component of bridge output voltage which is in phase with the oscillator voltage. Since the synchronous rectifier stage 65, which is supplied with radio frequency voltage for the anodes of the double-triode rectifier from the same oscillator 57 by way of leads 67, is sensitive only to this component, the indicator indicates for practical purposes only the parallel resistance of the crystal, very largely ignoring its capacity.

The oscillator and bridge circuits are of conventional design. The outer conductor of the coaxial cable 62 is connected to the cathode of the cathode follower 63 whereby the apparent capacitance is reduced by a factor of about 40. The amplifier 64 is broadly tuned, and by slightly detuning it a phase shift can be introduced to compensate for small accidental shifts of phase in other parts of the circuit. Thus the tuning condenser 68 may be adjusted until a deliberate small change in capacity between the crystal electrodes produces no change in meter deflection—this adjustment should be required infrequently. The general technique in contructing these stages is similar to that used in constructing a video amplifier.

As will be seen the unbalance voltage is applied to the grids of the double triodes 65 in parallel, and the radio frequency voltage from oscillator 57 is applied to their anodes in push-pull. (Capacitor 69 is provided to compensate for differences between the capacitances of the two triodes.) As a consequence the rectifier stage is unbalanced only by in-phase components in the out-of-balance voltage, and not by quadrature components. The rectified outputs appearing across the cathode load resistors 70, 71 are applied to the difference amplifier 66 which functions essentially as an impedance transformer between the rectifier stage 65 and the balance meter 72. Potentiometer 73 is an R.F. zero setting means, potentiometer 74 is a D.C. zero setting means, and variable resistor 75 is a sensitivity control.

The bridge circuit shown in Figure 8 is not suitable for crystal mountings in which one electrode makes contact with the metal enclosure for the crystal, but if this is necessary or desired a modified bridge arrangement can be used.

In the immediately preceding description the inphase component of the out-of-balance voltage was measured and is a measure of the equivalent parallel resistance of the crystal, which is approximately proportional to the surface conductivity of the crystal. A slow drift in the resistance calibration of the R.F. unit is of no consequence insofar as the hygrometer is concerned since a determination of the actual resistance is not necessary—it is only necessary that it fall to any value within a wide range and remain substantially constant at that value. Furthermore, the capacity between the electrodes varies with a one-to-one correspondence with the crystal surface conductivity, and this capacity, rather than the equivalent parallel resistance, could be measured by appropriate and obvious modifications to the synchronous rectifier.

The hygrometer of this invention may be used as a self-balancing and direct reading instrument. The balancing of the hygrometer at the equilibrium temperature can be made automatic by providing means whereby the resistance of the crystal governs the amount of heating or cooling. This is done conveniently by amplifying the out-of-balance voltage of the bridge and using the amplified voltage to govern the power dissipated in the electrical heater wound on the metal enclosure in which the crystal is disposed or to control a valve governing the supply of refrigerant to the cooling tube or channels. However, if self-balancing operation is required when the critical temperature is below ambient temperature, it is preferred to employ cooling and heating simultaneously and to allow the out-of-balance voltage of the bridge to control the heating. For a given crystal substance the temperature scale can be calibrated directly in dew-point temperatures.

Figure 9:
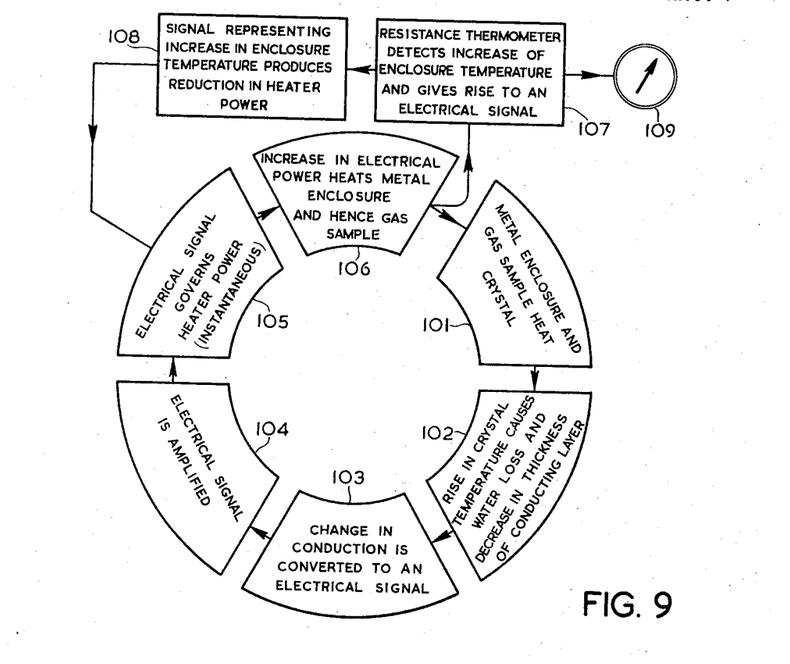
Figure 9 is a loop diagram of an automatic self-balancing and direct-reading hygrometer.

In order to enable a better understanding of the automatic control system to be described the loop diagram of Figure 9 will now be considered. The simplest arrangement for automatic operation is one in which the heater power is made to increase automatically with decrease in crystal surface resistance, or, alternatively, the cooling is made to decrease with decreasing surface resistance. In either case an approximately linear relationship is desirable. In general it is more convenient to vary the heater power automatically even if cooling below room temperature is required, in which case a steady flow of coolant around and through the enclosure for the crystal would be used.

Any control loop formed in this manner contains one link which is an almost perfect time-integrator provided by the process of deposition of moisture on the crystal surface. Since a constant deviation of temperature from the equilibrium value causes the crystal to take up or lose water at a constant rate, the electrical surface resistance of the crystal is inversely proportional to the negative time integral of the deviation of the temperature from the equilibrium value. As a consequence, when balance in the control loop occurs the crystal surface temperature must come to the true equilibrium temperature.

In the loop diagram the main control loop is shown by 101 to 106 inclusive. As the crystal enclosure temperature rises the crystal temperature also rises as represented at 101. This results in a water loss on the crystal surfaces and a decrease in the thickness of the conducting layer as represented at 102. The change in crystal surface resistance is converted to an electrical signal as represented at 103, this is amplified at 104, and the electrical signal used to govern the heater power as at 105. This last step is practically instantaneous. An increase in the heater power causes the temperature of the metal enclosure to rise as represented at 106 completing the loop. For operation to be stable (non-oscillatory) with the desired degree of amplification or gain around the loop, there must be no frequency for which the shift or phase around the whole control loop is $\pi$ (really $2\pi$ when the inversion due to control is included) and for which the loop gain exceeds unity (or in practice exceeds about 0.7). Since the integration process (due to deposition of water) represents a phase retardation of $\pi/2$ at any frequency, the additional phase retardation in the remaining sections of the loop must be less than $\pi/2$.

Analysis of the loop shows that, after care has been taken to minimize the phase shift in each component of the control loop, by far the most important contribution to the phase shift arises from the process: oscillating level of power in heater producing an oscillating temperature of metal enclosure. The phase shift in this process is relatively so large that it would normally dictate the maximum amplification which could be used without self-oscillation or, what corresponds, the fastest attainable time of response of the whole hygrometer.

To reduce the time of response steps can be taken to reduce this phase shift. This is shown in the figure by the second loop 107, 108 by which negative feedback is applied around the step represented by block 106. It is more convenient, however, to derive the output from block 108 as an electrical voltage which acts through the agency of block 105: this is an equivalent arrangement since the processes of block 105 are instantaneous, and is a convenient one since it allows the outputs of both blocks 104 and 108 to operate, after subtraction and power amplification, on the same heater winding. It will be seen that the heating process with such a feedback loop constitutes, in the absence of any power fluctuation originating in the main control loop, a simple temperature controller. The negative feedback or temperature loop must itself be stable, and is readily made so to a high degree provideed that the metal enclosure consists of a single relatively compact piece of metal as in the thermal unit shown in Figures 1 to 5. In practice it is preferred to make the step shown in block 108 an amplification process which has zero gain at zero frequency, the amplifier being designed so that its gain falls away to zero as the frequency is reduced appreciably below that which corresponds to the speed of response for which the whole system is designed. This eliminates or reduces the possibility of the output from block 108 saturating the electronic channels of block 105, except during transients. The temperature indicator 109 may be operated by the electrical signal arising from step 107.

Figure 10:
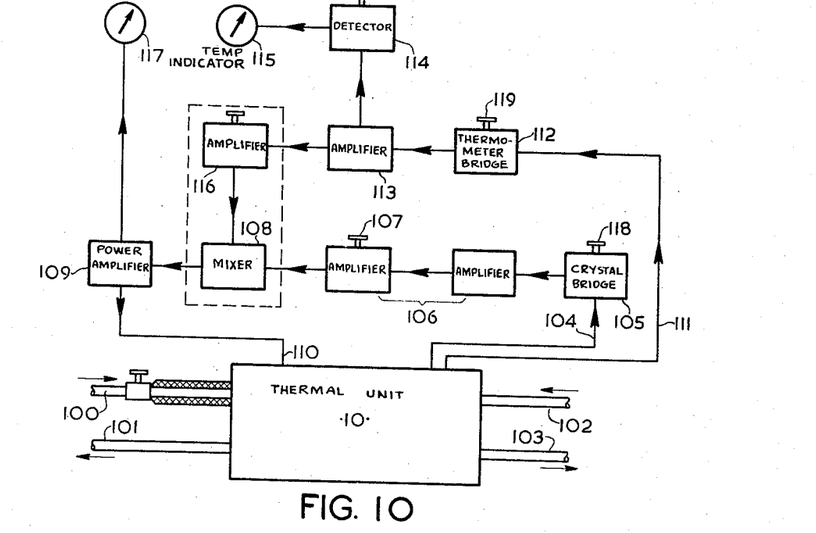
Figure 10 is a block diagram of a hygrometer in accordance with Figure 9.

A complete block diagram of an automatic hygrometer in accordance with this invention is shown in Figure 10. The thermal unit, such as that shown in Figures 1 to 5, is shown at 10. Provision is made for the passage of coolant at a continuous rate through the metal enclosure in the thermal unit, coolant entering at 100 and leaving at 101. The gas sample enters at 102 and leaves at 103. The leads from the crystal electrodes, shown at 104, are taken to an A.C. Wheatstone bridge 105, the out-of-balance voltage is amplified by amplifier 106 having a gain control 107, and the amplified voltage applied to a mixer 108, the output from which is amplified in power amplifier 109 and applied to the heater winding by leads 110. The leads 111 from the resistance thermometer winding are taken to a Wheatstone bridge 112, the out-of-balance voltage of which is amplified by 113 and the output thereof applied to a detector 114 and temperature indicator 115. The output from amplifier 13 is further amplified by amplifier 116 if necessary and also applied as a negative feedback voltage to the mixer 108. An indicator 117 can be provided for the heater power. Resistance and temperature range controls 118, 119 respectively may be provided which select the ratio arms or their equivalent in the bridges.

The hygrometer of the present invention, as a manually balanced instrument, is much more rapidly used than the manually operated dew-point apparatus, and it almost entirely eliminates the human factor. The hygrometer of the present invention is easily made more rapid in operation than the "Dewcel" hygrometer. Levels of contamination that would appreciably affect the accuracy of the dew-point and "Dewcel" hygrometers can be tolerated without appreciable loss of accuracy and removal of an excessive amount of contamination is very simple, being effected merely by adding a drop of distilled water to the crystal, and, after a few seconds, removing most of the liquid with the edge of a piece of filter paper. In the dew-point and "Dewcel" hygrometers errors due to contamination may easily occur unnoticed.

The hygrometer of the present invention does not add to or remove from the gas a significant amount of moisture during operation.

The hygrometer of the present invention may easily be constructed in a form to operate at pressures of even a few thousand pounds per square inch whereas use of the dew-point hygrometer at these pressures is almost impossible. The present hygrometer requires a pressure seal for only one electrical conductor, which may be, for example, a spark plug. The range of the present hygrometer is continuous down to the eutectic temperature of the saturated salt solution, which for a suitable salt, may be as low as −55° C. While the dew-point hygrometer has an unrestricted range the range is discontinuous at 0° C. and below this temperature an interval exists in which the nature of the deposit (dew or frost) is very uncertain. The "Dewcel" is restricted to humidities for which the equilibrium temperature is above ambient temperature, which means in practice that it is limited to relative humidities above about 15% (reckoned at ambient temperature).

Operated as a self balancing instrument, the hygrometer of the present invention may be used as the humidity-sensing element in a humidity controller.

The hygrometer of the present invention has high adaptability. It can be used with any one of a number of stable salts, and the crystals can be changed in a few minutes. Once the temperature-vapour pressure relationship is known for one saturated salt solution it provides a convenient and accurate means of determining the relationship for any other saturated salt solution. Changing the solution of a "Dewcel" cover involves problems of uniformity and quantity and of drying and involves a considerably longer time. It would also result in more severe restrictions on the range. The dew-point hygrometer does not allow of any corresponding variations.

When cooling is employed, methods other than those using a cooling or refrigerant gas or liquid are possible. For example thermoelectric cooling could be used or, with a suitable design, the metal enclosure could be cooled by conducting heat away along a metal connection to a cooler medium.

What is claimed is:

1. A hygrometer comprising an ionic crystal element, an enclosure for the crystal element, means for bringing the gas whose humidity is to be measured into the enclosure and into contact with the crystal element at a temperature substantially equal to that of the crystal element, a resistance measuring unit to detect the electrical surface resistance of the crystal element and changes in that resistance, automatic means under the control of the resistance measuring unit for varying the temperature of the crystal element and bringing it to and maintaining it at a temperature such that the said resistance comes to and remains at a substantially constant value, and means for indicating the said temperature.

2. A hygrometer comprising a crystalline ionic substance selected from the class consisting of a single crystal or a group of crystals having no fissures between crystals or in individual crystals, electrodes on opposing faces of the crystalline ionic substance, a metal enclosure for the crystalline ionic substance and its electrodes, heat exchange means including the enclosure, means for bringing the gas whose humidity is to be measured through the heat exchange means and into the enclosure to surround the crystalline ionic substance, means for detecting the electrical surface resistance of the crystalline ionic substance, means for varying the temperature of the enclosure to bring the gas and the crystalline ionic substance to a temperature at which the crystalline ionic substance attains a substantial and substantially constant value of surface resistance, and means for indicating the said temperature at which the said constant value of surface resistance is attained.

3. A hygrometer comprising an ionic crystal element, electrodes on one or more faces of the crystal element, a resistance measuring unit connected to said electrodes to detect the electrical surface resistance of the crystal element and changes in that resistance, and enclosure for the crystal element, means for bringing the gas whose humidity is to be measured into the enclosure and into contact with the crystal element at a temperature substantially equal to that of the crystal element, means for varying the temperature of the gas in the enclosure, and means for indicating the temperature of the gas at which the resistance of the crystal element is substantial and constant, said ionic crystal element being selected from the class consisting of a single crystal and a group of crystals containing no fissures either between crystals or in individual crystals.

4. A hygrometer comprising an ionic crystal element, electrodes on one or more faces of the crystal element, a resistance measuring unit connected to said electrodes to detect the electrical surface resistance of the crystal element and changes in that resistance, a metal enclosure for the crystal element, means for heating the enclosure, a heat exchanger in contact with the metal enclosure, means for passing the gas whose humidity is to be measured through the heat exchanger and into the enclosure whereby the gas is brought into contact with the crystal element at substantially the same temperature as the crystal element, and means for indicating the temperature of the gas and crystal element at which the resistance of the crystal element is substantial and constant, said ionic crystal element being selected from the class consisting of a single crystal and a group of crystals containing no fissures either between crystals or in individual crystals.

5. A hygrometer comprising an ionic crystal element, electrodes on one or more faces of the crystal element, a resistance measuring unit connected to said electrodes to detect the electrical surface resistance of the crystal element and changes in that resistance, a metal enclosure for the crystal element, a heat exchanger including the walls of the said enclosure, passages through the heat exchanger through which a refrigerant gas or liquid may be circulated, further passages through the heat exchanger communicating with the interior of the metal enclosure whereby the gas whose humidity is to be measured is passed through the heat exchanger and into contact with the crystal element at a temperature substantially equal to that of the crystal element, means for indicating the temperature of the enclosure at which the resistance of the crystal element is substantial and constant, said crystal element being selected from the class consisting of a single crystal and a group of crystals containing no fissures either between crystals or in individual crystals.

6. A hygrometer comprising an ionic crystal element, electrodes on spaced faces of the crystal element, a resistance measuring unit connected to said electrodes to detect the electrical surface resistance of the crystal element and changes in that resistance, a cylindrical tubular member closed at one end and forming an enclosure for the crystal element, an electrical heating element wound around and insulated from the enclosure, a first plurality of longitudinal passages in the annular wall of the enclosure for the passage of refrigerant, a second plurality of longitudinal passages in the annular wall of the enclosure which communicate with the bore of the enclosure near its said one end, means for circulating the gas whose humidity is to be measured through the said second plurality of longitudinal passages and into contact with the crystal element, means for circulating refrigerant through the said first plurality of longitudinal passages at a controlled rate, a source of electric energy, connections between the source of electric energy and the heating element, means in said connections for varying the supply of electrical energy to the heating element, and means for indicating the temperature of the enclosure at which the resistance of the crystal element is substantial and constant, said ionic crystal element being selected from the class consisting of a single crystal and a group of crystals containing no fissures either between crystals or in individual crystals.

7. A hygrometer as claimed in claim 6 wherein the said electrodes are a graphite lamina in thermal contact with the closed end of the enclosure and a graphite lamina held against the crystal element by spring pressure.

8. A hygrometer comprising a single crystal of an ionic substance, conducting layers applied to opposite faces of the crystal and which extend over part of each adjacent face of the crystal, a resistance measuring unit connected to said conducting layers to detect the electrical surface resistance of the crystal and changes in that resistance, a cylindrical tubular member closed at one end and enclosing the crystal, an electrical heating element wound around and insulated from the enclosure, means for passing a controlled current through the heating element, a first plurality of longitudinal passages in the annular wall of the tubular member, means for circulating refrigerant through the first plurality of passages at a controlled rate, a second plurality of longitudinal passages in the annular wall of the tubular member which communicate with the bore of the tubular member near its closed end, means for circulating gas whose humidity is to be measured through said second plurality of longitudinal passages and into contact with the crystal, and means for indicating the temperature of the said tubular member at which the resistance of the crystal is substantial and constant.

9. A hygrometer comprising an ionic crystal element, a source of radio frequency energy, electrodes by which the radio frequency energy is applied across the crystal element, an admittance measuring unit for detecting variations in the admittance of the crystal at the radio frequency, an enclosure for the crystal element, means for bringing the gas whose humidity is to be measured into the enclosure and into contact with the crystal element at a temperature substantially equal to that of the crystal element, means for varying the temperature of the gas in the enclosure, and means for indicating the temperature of the gas at which the admittance of the crystal element is substantial and constant, said ionic crystal element being selected from the class consisting of a single crystal and a group of crystals containing no fissures either between crystals or in individual crystals.

10. A hygrometer comprising a single crystal of an ionic substance, electrodes by which radio frequency energy can be applied to faces of the crystal, a radio frequency bridge arrangement with the crystal in one arm, an amplifier for the out-of-balance voltage from the bridge which amplifies the said voltage with zero phase-shift, a synchronous detector to which the amplified voltage is applied, a radio frequency oscillator, connections from the oscillator to the radio frequency bridge and to the synchronous detector, the detector being sensitive substantially to variations in one phase component of the out-of-balance voltage only, indicator means connected to the detector whereby to indicate variations in the admittance of the crystal, an enclosure for the crystal, means for bringing the gas whose humidity is to be measured into the enclosure and into contact with the crystal at a temperature substantially equal to that of the crystal, means for varying the temperature of the gas in the enclosure, and means for indicating the temperature of the gas at which the admittance of the crystal is substantial and constant.

11. A hygrometer as claimed in claim 10 wherein there is a thin layer of dielectric such as wax between the electrodes and the surface of the crystal.

12. A hygrometer comprising an ionic crystal element, a metal enclosure for the crystal element, a heater winding in thermal contact with the enclosure, means for bringing the gas whose humidity is to be measured into the enclosure and into contact with the crystal element at a temperature substantially equal to that of the crystal element, a resistance measuring unit to convert deviations of the electrical surface resistance of the crystal element from a selected value into an electrical signal, an amplifier for amplifying said electrical signal and applying it to the said heating winding, whereby the crystal element is brought to a temperature at which its surface resistance is brought to and held constant at the said selected value, and means for indicating the temperature of the gas and enclosure, said ionic crystal element being selected from the class consisting of a single crystal and a group of crystals containing no fissures either between crystals or in individual crystals.

13. A hygrometer comprising a single crystal of an ionic substance, a metal enclosure for the crystal, a heater winding in thermal contact with the enclosure, means for bringing a gas whose humidity is to be measured into the enclosure and into contact with the crystal at a temperature substantially equal to that of the crystal, a resistance-measuring unit to convert deviations of the electrical surface resistance of the crystal from a selected value into a first electrical signal, means for measuring the temperature of the gas and enclosure to give a second electrical signal whose value is governed by the temperature, an amplifier including two separate input channels and which receives the said first and second electrical signals as the inputs to the input channels and which provides a single output voltage which is approximately proportional to the difference of the two input voltages, the output voltage being applied to the said heater winding, the heater voltage increasing with decreasing crystal surface resistance and with decreasing temperature whereby the crystal is brought to a temperature at which its surface resistance is constant and equal to the selected value, and means for indicating the temperature of the gas.

14. A hygrometer as claimed in claim 13 in which the crystal element is selected from the class consisting of potassium sulphate, potassium chloride, potassium iodide, sodium chloride and calcium chloride hexahydrate.

References Cited in the file of this patent

UNITED STATES PATENTS

| | | |
|---|---|---|
| 2,064,651 | Fiene | Dec. 15, 1936 |
| 2,435,895 | McIlvaine | Feb. 10, 1948 |
| 2,624,195 | Van Alen | June 6, 1953 |